(12) United States Patent
Kim et al.

(10) Patent No.: US 10,055,074 B2
(45) Date of Patent: Aug. 21, 2018

(54) TOUCH WINDOW

(71) Applicant: LG INNOTEK CO., LTD., Seoul (KR)

(72) Inventors: Seung Jin Kim, Seoul (KR); Jong Sun Kim, Seou (KR); Dong Mug Seong, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 22 days.

(21) Appl. No.: 15/127,450

(22) PCT Filed: May 22, 2015

(86) PCT No.: PCT/KR2015/005175
§ 371 (c)(1),
(2) Date: Sep. 20, 2016

(87) PCT Pub. No.: WO2015/178726
PCT Pub. Date: Nov. 26, 2015

(65) Prior Publication Data
US 2017/0139512 A1    May 18, 2017

(30) Foreign Application Priority Data

May 23, 2014  (KR) .................. 10-2014-0062105
Oct. 1, 2014    (KR) .................. 10-2014-0132471

(51) Int. Cl.
*G06F 3/044*    (2006.01)
*G06F 3/041*    (2006.01)
(Continued)

(52) U.S. Cl.
CPC ............ *G06F 3/044* (2013.01); *G06F 3/0412* (2013.01); *B60K 35/00* (2013.01);
(Continued)

(58) Field of Classification Search
CPC .................. G06F 3/044; G06F 3/0412; G06F 2203/04112; G06F 3/047; G02F 1/134309; G02F 1/13338
See application file for complete search history.

(56) References Cited

U.S. PATENT DOCUMENTS

2013/0087441 A1    4/2013  Kim et al.
2014/0015766 A1*  1/2014  Lin .................. G06F 3/044
                                                    345/173

(Continued)

FOREIGN PATENT DOCUMENTS

KR    10-2014-0017009    2/2014
KR    10-2014-0027798    3/2014
(Continued)

OTHER PUBLICATIONS

International Search Report dated Aug. 21, 2015 issued in Application No. PCT/KR2015/005175.

*Primary Examiner* — Sanjiv D Patel
(74) *Attorney, Agent, or Firm* — KED & Associates LLP

(57) ABSTRACT

Disclosed is a touch window including a substrate, and a sensing electrode provided on the substrate and a wire electrode connected with the sensing electrode. The substrate includes a first area having the sensing electrode and a second area having the wire electrode. The first area has the sensing electrode by a first closing ratio, the second area has the wire electrode by a second closing ratio, and a size of the first closing ratio is equal to or different from a size of the second closing ratio.

9 Claims, 6 Drawing Sheets

(51) Int. Cl.
 *B60K 35/00* (2006.01)
 *G02F 1/1333* (2006.01)
(52) U.S. Cl.
 CPC .. *B60K 2350/927* (2013.01); *G02F 1/133305* (2013.01); *G06F 2203/04101* (2013.01); *G06F 2203/04102* (2013.01); *G06F 2203/04112* (2013.01)

(56) References Cited

U.S. PATENT DOCUMENTS

| | | | |
|---|---|---|---|
| 2014/0057369 A1 | 2/2014 | Lee et al. | |
| 2014/0078416 A1* | 3/2014 | Kim | G06F 3/044 349/12 |
| 2014/0218325 A1 | 8/2014 | Iwami | |
| 2014/0327842 A1* | 11/2014 | Tang | G06F 3/044 349/12 |
| 2014/0347319 A1* | 11/2014 | Lin | G06F 3/044 345/174 |
| 2015/0160760 A1* | 6/2015 | Sato | G06F 3/044 345/174 |
| 2015/0212617 A1* | 7/2015 | Yoo | G06F 3/044 345/174 |

FOREIGN PATENT DOCUMENTS

| | | |
|---|---|---|
| KR | 10-2014-0028219 | 3/2014 |
| KR | 10-2014-0044720 | 4/2014 |
| KR | 10-2014-0074329 | 6/2014 |

* cited by examiner

[Fig. 1]
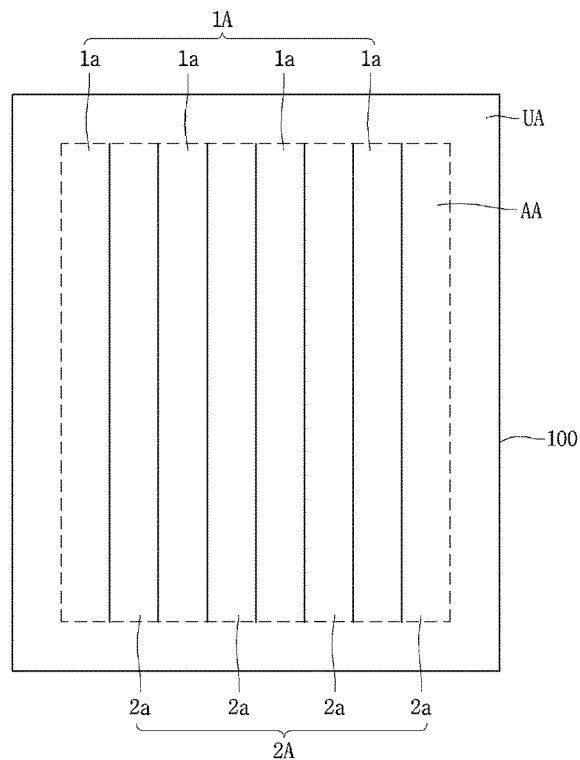
[Fig. 2]
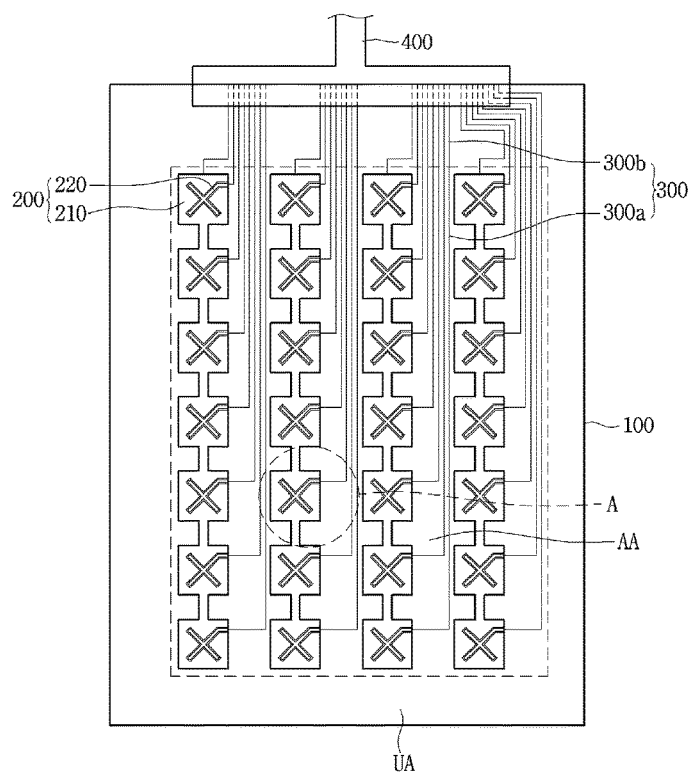

[Fig. 3]
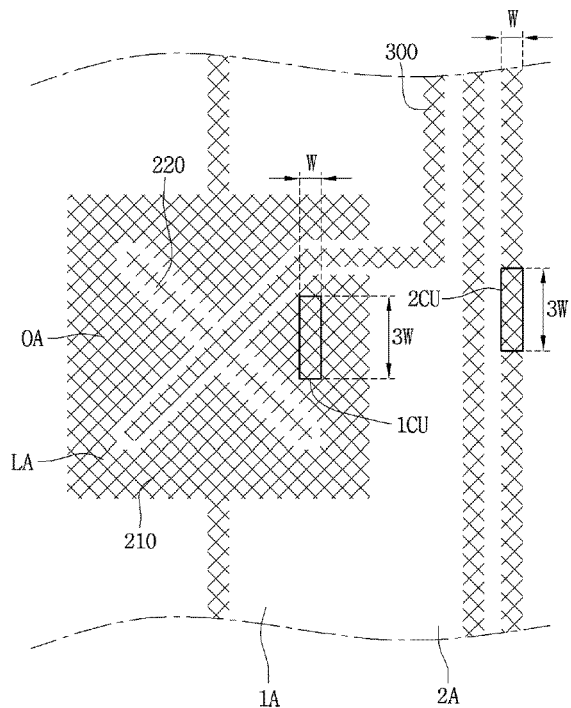
[Fig. 4]
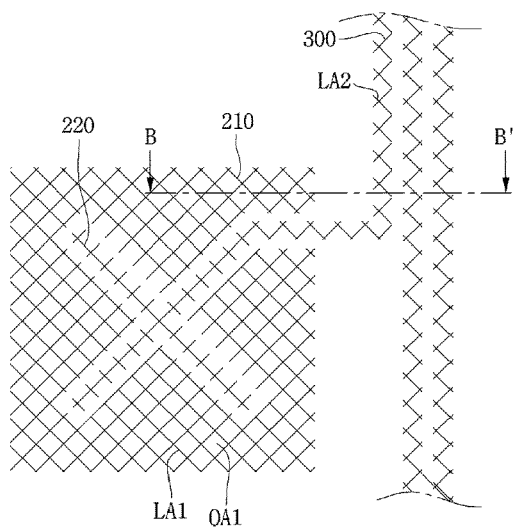
[Fig. 5]
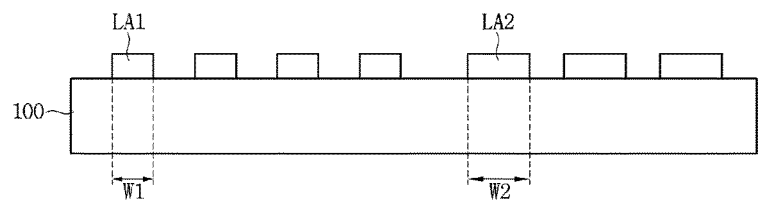

[Fig. 6]
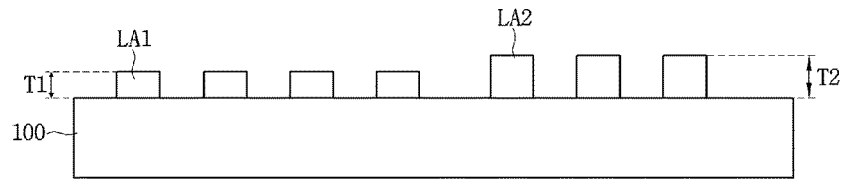
[Fig. 7]
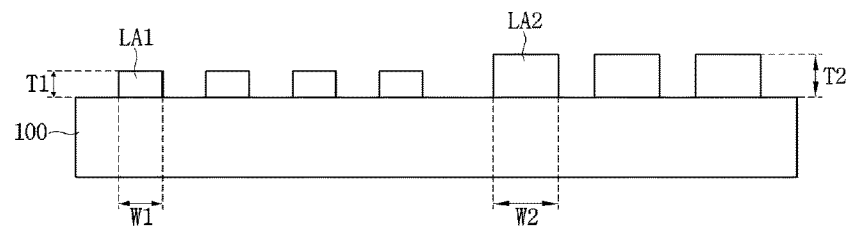
[Fig. 8]
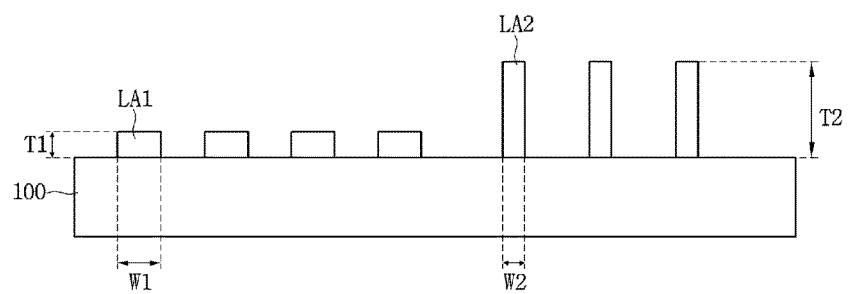
[Fig. 9]
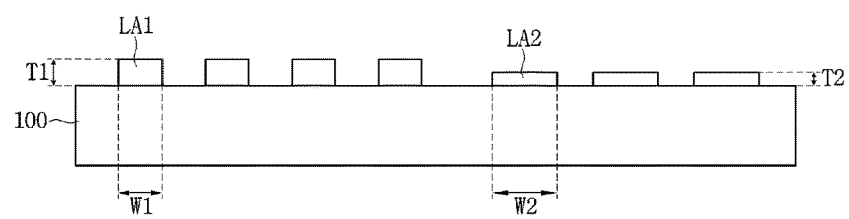
[Fig. 10]
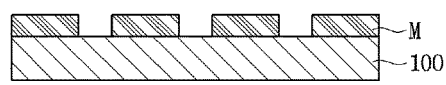

[Fig. 11]
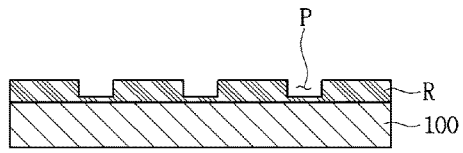
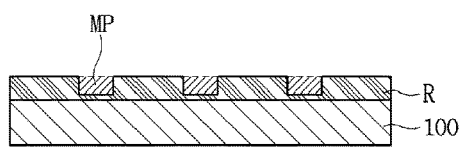
[Fig. 12]
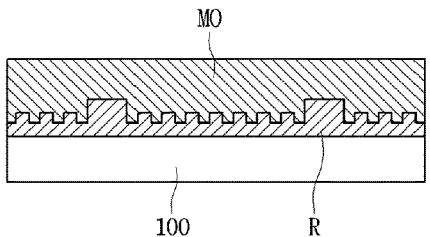
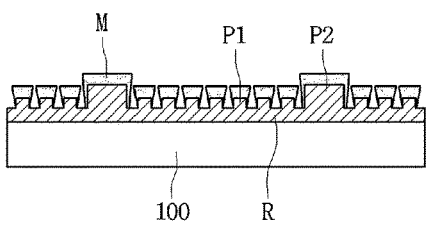
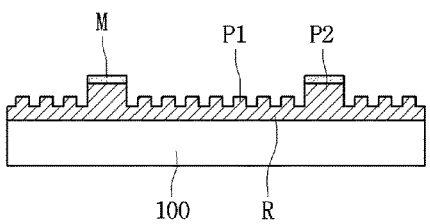

[Fig. 13]
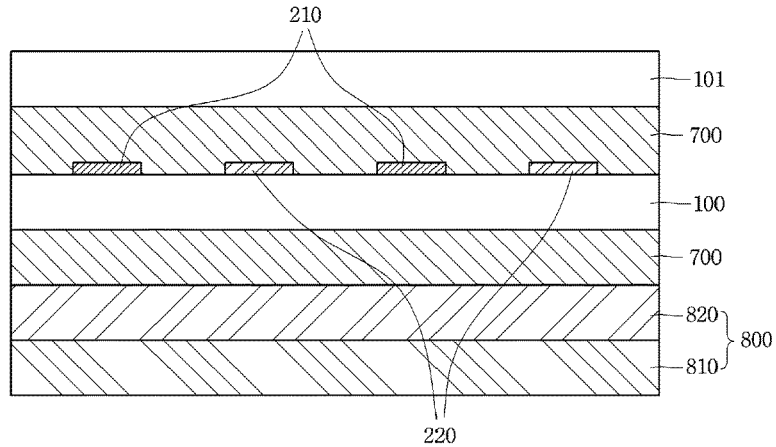
[Fig. 14]
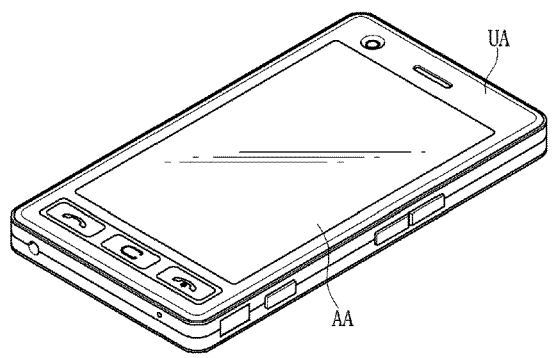
[Fig. 15]
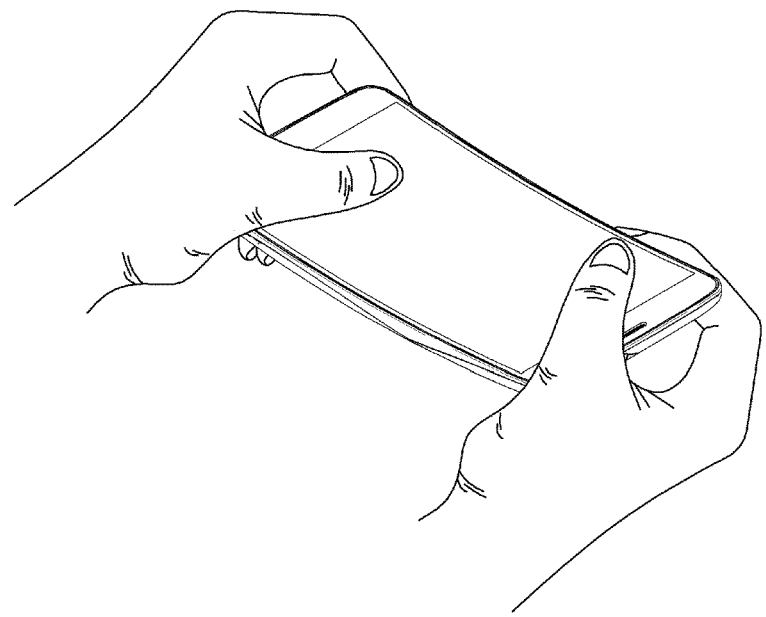

[Fig. 16]
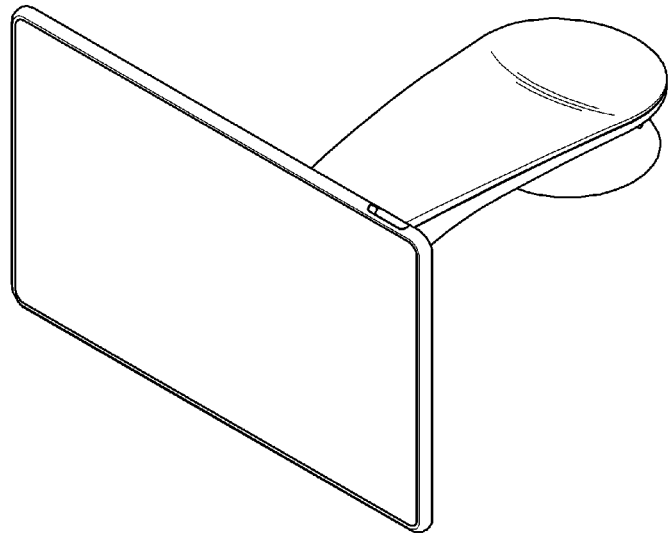
[Fig. 17]

TOUCH WINDOW

CROSS-REFERENCE TO RELATED PATENT APPLICATIONS

This application is a U.S. National Stage Application under 35 U.S.C. § 371 of PCT Application No. PCT/KR2015/005175, filed May 22, 2015, which claims priority to Korean Patent Application Nos. 10-2014-0062105, filed May 23, 2014, and 10-2014-0132471, filed Oct. 1, 2014, whose entire disclosures are hereby incorporated by reference.

TECHNICAL FIELD

The embodiment relates to a touch window.

BACKGROUND ART

Recently, a touch window, which performs an input function through the touch of an image displayed on a display device by an input device such as a finger or stylus, has been applied to various electronic appliances.

The touch window may be typically classified into a resistive touch window and a capacitive touch window. In the resistive touch window, the position of the touch point is detected by detecting the variation of resistance according to the connection between electrodes when pressure is applied to an input device. In the capacitive touch window, the position of the touch point is detected by detecting the variation in capacitance when a finger of the user is touched on the capacitive touch window between electrodes. When taking into consideration the convenience of a fabrication scheme and a sensing power, the capacitive touch window has been spotlighted in a smaller model touch window recently.

The touch window has a substrate provided thereon with a sensing electrode and a wire electrode connected with the sensing electrode, and may detect a touch position by detecting the variation of the capacitance when an area where the sensing electrode is provided is touched.

In this case, the sensing electrode and the wire electrode may be provided on one surface of one substrate or provided on one surface of each of a plurality of substrates.

When the sensing electrode and the wire electrode are provided on one surface of the one substrate, the wire electrode may be withdrawn in various directions. For example, the wire electrode may extend from an active area and a non-active area.

In this case, when wire electrodes provided on the active area include metal, the wire electrode may be viewed from an outside.

Accordingly, a touch window having a novel structure capable of solve the above problem is required.

DISCLOSURE OF INVENTION

Technical Problem

The embodiment provides a touch window having improved reliability and efficiency.

Solution to Problem

According to the embodiment, there is provided a touch window including a substrate, and a sensing electrode provided on the substrate and a wire electrode connected with the sensing electrode. The substrate includes a first area having the sensing electrode and a second area having the wire electrode. The first area has the sensing electrode by a first closing ratio, the second area has the wire electrode by a second closing ratio, and a size of the first closing ratio is equal to or different from a size of the second closing ratio.

Advantageous Effects of Invention

As described above, according to the touch window of the embodiment, the visibility of the touch window can be improved.

In addition, the ratios of areas where the sensing electrode and the wire electrode are provided on the substrate and areas where the sensing electrode and the wire electrode are not provided on the substrate can be properly adjusted, thereby controlling the light transmittance in the area having the sensing electrode and the area having the wire electrode, for example the difference in light intensity between the area having the sensing electrode and the area having the wire electrode, so that the visibility can be prevented from being degraded due to the difference in light intensity between the sensing part and the wire part.

In addition, according to the touch window of the embodiment, the mesh line of the wire electrode and the mesh line of the sensing electrode can be provided mutually differently from each other in size. In detail, the mesh line of the wire electrode can be greater than the mesh line of the sensing electrode in width and thickness, or the mesh line of the wire electrode can be wider than the mesh line of the sensing electrode in area, so that the mesh line of the wire electrode and the mesh line of the sensing electrode can be mutually different from each other in size.

Accordingly, the mesh electrode of the wire electrode can be sufficiently widely provided as compared with that of the sensing electrode part, so that the sheet resistance and the line resistance of the wire electrode can be reduced.

Therefore, the wire electrode extending from the active area from the unactive area can be prevented from being viewed from the outside, so that the visibility of the touch window can be improved, and the resistance of the wire electrode can be reduced. Accordingly, the efficiency of the touch window can be improved.

Accordingly, the touch window according to the embodiment can have improved reliability and improved efficiency.

BRIEF DESCRIPTION OF DRAWINGS

FIG. 1 is a top view showing a substrate of a touch window according to the embodiment.

FIG. 2 is a top view showing a touch window according to the embodiment.

FIG. 3 is an enlarged view showing an area A of FIG. 2 according to the first embodiment.

FIG. 4 is an enlarged view showing an area A of FIG. 2 according to the second embodiment.

FIG. 5 is a sectional view taken along line B-B' of FIG. 4 of a touch window according to the second embodiment.

FIG. 6 is a sectional view taken along line B-B' of FIG. 4 of another touch window according to the second embodiment.

FIG. 7 is a sectional view taken along line B-B' of FIG. 4 of still another touch window according to the second embodiment.

FIG. 8 is a sectional view taken along line B-B' of FIG. 4 of still another touch window according to the second embodiment.

FIG. 9 is a sectional view taken along line B-B' of FIG. 4 of still another touch window according to the second embodiment.

FIGS. 10 to 12 are sectional views showing an electrode forming process of a sensing electrode and/or a wire electrode according to the embodiments.

FIG. 13 is a sectional view showing a touch device formed by combining the touch window according to the embodiments with a display panel.

FIGS. 14 to 17 are views showing examples of a touch device employing the touch window according to the embodiment.

MODE FOR THE INVENTION

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

In addition, when a predetermined part "is connected to" another part, this means not only that the predetermined part is directly connected to another part, but also that the predetermined is indirectly connected to another part while interposing another component between the predetermined part and another part. In addition, when a predetermined part "includes" a predetermined component, the predetermined part does not exclude other components, but may further include other components unless indicated otherwise.

The thickness and size of each layer shown in the drawings may be exaggerated, omitted or schematically drawn for the purpose of convenience or clarity. In addition, the size of elements does not utterly reflect an actual size.

Referring to FIGS. 1 to 3, a touch window according to the embodiment may include a substrate 100, a sensing electrode 200, a wire electrode 300, and a printed circuit board 400.

The substrate 100 may be rigid or flexible. For example, the substrate 100 may include glass or plastic. In detail, the substrate 100 may include chemically tempered/semi-tempered glass, such as soda lime glass or aluminosilicate glass, reinforced plastic or flexible plastic, such as polyimide (PI), polyethylene terephthalate (PET), propylene glycol (PPG) or polycarbonate (PC), or sapphire.

In addition, the substrate 100 may include an optical isotropic film. For example, the substrate 100 may include cyclic olefin copolymer (COC), cyclic olefin polymer (COP), an optical isotropic polycarbonate (PC), or optical isotropic polymethylmethacrylate (PMMA).

The sapphire has superior electric characteristics, such as permittivity, so that a touch response speed may be remarkably increased and a space touch, such as hovering, may be easily implemented. The sapphire has high surface hardness, so the sapphire may be used for a cover substrate. The hovering signifies a technique of recognizing coordinates even at a short distance from a display.

In addition, the substrate 100 may be bendable to have a partial curved surface. In other words, the substrate 100 is bendable such that a portion of the substrate has a flat surface and another portion of the substrate has a curved surface. In detail, an end portion of the substrate 100 may be bent with a curved surface or may be curved or bent with a surface having a random curvature.

In addition, the substrate 100 may be a flexible substrate having a flexible characteristic.

Further, the substrate 100 may include a curved or bended substrate. In this case, the touch panel including the substrate may have flexible, curved or bended characteristics. Accordingly, the touch panel according to the embodiment can be easily carried and variously designed.

The substrate 100 may include a cover substrate. In addition, an additional cover substrate may be additionally provided on the substrate 100. In this case, the substrate may be bonded to the cover substrate through an adhesive layer.

The substrate 100 may have an active area AA and an unactive area UA defined thereon.

An image may be displayed on the active area AA and may not be displayed on the unactive area UA disposed around the active area AA.

In addition, a position of an input device (for example, a finger) may be detected in at least one of the active area AA and the unactive area UA. If the input device, such as the finger, touches the touch panel, capacitance variation may occur in an area touched by the input device, so the area is detected as the touch position.

Referring to FIG. 1, the substrate 100 may have a first area 1A and a second area 2A defined thereon. In detail, the first and second areas 1A and 2A may be defined in the active area AA of the substrate 100

The first area 1A may be defined as an area where the sensing electrode 200 is provided, and the second area 2A may be defined as an area where the wire electrode 300 is provided.

The sensing electrode 200 may be provided on the substrate 100. In detail, the sensing electrode 200 may be provided on at least one of the active area AA and the unactive area UA of the substrate 100. Preferably, the sensing electrode 200 may be provided on the active area AA of the substrate 100. In other words, the sensing electrode 200 may be provided on the first area 1A of the active area AA of the substrate 100.

The sensing electrode 200 may include a first sensing electrode 210 and a second sensing electrode 220.

The first and second sensing electrodes 210 and 220 may be provided on one surface of the substrate 100. In detail, the first and second sensing electrodes 210 and 220 may be provided on the same surface of the substrate 100. In other words, the first and second sensing electrodes 210 and 220 may be spaced apart from each other without the contact therebetween on the same surface.

The sensing electrode 200 may include a transparent conductive material allow electricity to flow without the blocking of the light transmission. For example, the sensing electrode 200 may include metal oxide such as indium tin oxide (ITO), indium zinc oxide (IZO), copper oxide, tin oxide, zinc oxide, or titanium oxide.

In addition, the sensing electrode 200 may include a nanowire, a photosensitive nanowire film, carbon nanotube (CNT), graphene, conductive polymer or the mixture thereof.

When a nanocomposite, such as a nanowire or a carbon nanotube, is used, the sensing electrode 200 may be configured in black color, and the content of nanopowders is adjusted to ensure electrical conductivity while controlling color and reflectance.

In addition, the sensing electrode 200 may include various metals. For example, the sensing electrode 200 may include at least one of chromium (Cr), nickel (Ni), copper (Cu), aluminum (Al), silver (Ag), molybdenum (Mo), gold (Au), titanium (Ti), and the alloy thereof.

At least one of the first and second sensing electrodes 210 and 220 may have a mesh shape. In detail, at least one of the first and second sensing electrodes 210 and 220 may include a plurality of sub-electrodes, and the sub-electrodes may cross each other in the mesh shape.

In detail, referring to FIG. 3, at least one of the first and second sensing electrodes 210 and 220 may include a mesh line LA formed by the sub-electrodes crossing each other in the mesh shape and a mesh opening part OA between mesh lines. In this case, a line width of the mesh line LA may be in the range of about 0.1 µm to about 10 µm. The mesh line LA having a line width less than about 0.1 µm may not be formed due to the characteristic of the manufacturing process. If the mesh line LA has a line width exceeding about 10 µm, the sensing electrode pattern may be viewed from the outside so the visibility may be deteriorated. Preferably, the line width of the mesh line LA may be in the range of about 0.5 µm to about 7 µm. More preferably, the line width of the mesh line LA may be in the range of about 1 µm to about 3.5 µm.

The mesh opening part OA may have various shapes. For example, the mesh opening part OA may have various shapes such as a polygonal shape including a rectangular shape, a diamond shape, a pentagonal shape or a hexagonal shape, or a circular shape. In addition, the mesh opening part OA may have a regular shape or a random shape.

Since the sensing electrode has the mesh shape, the pattern of the sensing electrode may not be viewed on the active area AA. That is, even if the sensing electrode is formed of metal, the pattern may not be viewed. In addition, even if the sensing electrode is applied to a large-size touch panel, the resistance of the touch panel may be lowered.

The sensing electrode 200 may be provided on the first area 1A. In detail, the first area 1A may be divided into a closing part where the sensing electrode 200 is provided and an opening part where the sensing electrode 200 is not provided. In this case, the opening part may refer to an area where the mesh lines crossing each other are provided when the sensing electrode is provided in the mesh shape. In addition, the opening part may refer to an area where the mesh line is not provided and formed by the mesh lines.

The sensing electrode 200 may be arranged by a first closing ratio based on a whole first area. In other words, the sensing electrode may be arranged in the first area 1A by the first closing ratio defined as a ratio of an arrangement area of the sensing electrode to the whole first area. In other words, the first closing ratio may be defined as a ratio of the arrangement area of the sensing electrode to the whole first area.

The wire electrode 300 may be connected with the sensing electrode 200. The wire electrode 300 may be provided on at least one of the active area AA and the unactive area UA of the substrate 100. In detail, the wire electrode 300 may be provided in the active area AA and the unactive area UA of the substrate 100.

The wire electrode 300 may include a first sub-wire electrode 300a and a second sub-wire electrode 300b. In detail, the wire electrode 300 may include the first sub-wire electrode 300a provided on the active area AA and a second sub-wire electrode 300b provided on the unactive area UA. The first sub-wire electrode 300a may be formed integrally with the second sub-wire electrode 300b.

The wire electrode 300 may extend from the active area of the substrate 100 to the unactive area of the substrate 100. In detail, the wire electrode 300 may be provided on the second area 2A of the active area AA of the substrate 100 and may extend in the direction of the unactive area.

The wire electrode 300 may extend in the direction of the unactive area so that the wire electrode 300 may be connected with the printed circuit board 400. In addition, the wire electrode 300 may be provided on the same surface of the substrate 100 on which the first sensing electrode 210 and the second sensing electrode 220 are provided.

The wire electrode 300 may have the mesh shape similarly to that of the sensing electrode. In addition, the first and second sub-wire electrodes 300a and 300b may have the mesh shape. In addition, the wire electrode 300 may include the same material as or a material similar to that of the sensing electrode described above.

The wire electrode 300 may be provided on the second areas 2A. In detail, the first sub-wire electrode 300a provided on the active area AA may be provided on the second area 2A.

The second area 2A may be divided into a closing part where the wire electrode 300 is provided and an opening part where the wire electrode 300 is not provided. In this case, the closing part may refer to an area where mesh lines crossing each other is provided when the wire electrode is provided in the mesh shape, and the opening part may refer to a mesh opening part formed by the mesh lines.

The wire electrode 300 may be arranged by a second closing ratio based on a whole second area. In other words, the wire electrode may be arranged in the whole second area by the second closing ratio which is defined as a ratio of the arrangement area of the wire electrode to the whole second area. In other words, the second closing ratio may be defined as a ratio of the arrangement area of the wire electrode to the whole second area In detail, referring to FIG. 3, a second unit area 2CU having a column-directional width W and a row-direction width 3W may be defined in the wire electrode 300. In addition, a first unit area 1CU having the same area as that of the second unit area 2CU may be defined in the sensing electrode 200.

In this case, the first closing ratio may be defined as an arrangement area of the mesh line of the sensing electrode in the first unit area 1CU, and the second closing ratio may be defined as an arrangement area of the mesh line of the wire electrode in the second unit area 2CU.

The area ratios of the sensing electrode 200 and the wire electrode 300 provided on the active area AA may be equal to each other or different from each other. In detail, the first closing ratio defined as a ratio of the arrangement area of the sensing electrode 200 to the whole first area on the first area 1A may be equal to or different from each other the second closing ratio defined as a ratio of the arrangement area of the wire electrode 300 to the whole area of the second area 2A.

The size of the second closing ratio may be in the range of about 0.8 times to about 1.2 times greater than the size of the first closing ratio. In detail, the size of the second closing ratio may be about 0.9 times to about 1.1 times greater than the size of the first closing ratio. In more detail, the size of the second closing ratio may be about 0.98 times to about 1.02 times greater than the size of the first closing ratio.

In other words, the size of the first closing ratio may equal to or different from the size of the second closing ratio. In detail, the size of the first closing ratio and the size of the second closing ratio may be different from each other, or the size of the first closing ratio may be greater than the size of the second closing ratio, or the size of the second closing ratio may be greater than the size of the first closing ratio.

Preferably, the size of the first closing ratio may be greater than the size of the second closing ratio. When the size of the first closing ratio is greater than that of the second closing ratio, the second closing ratio may have the size in the range of 0.8 times to less than 1 times greater than that of the first closing ratio. In detail, the second closing ratio may have the size in the range of 0.9 times to less than 1 times greater than the size of the first closing ratio. In more detail, the second closing ratio may have the size in the range of 0.98 times to less than 1 times greater than the size of the first closing ratio.

In other words, the first and second closing ratios make about 2% to about 20% difference in size ratio therebetween.

If the difference in the size ratio between the first and second closing ratios exceeds about 20%, the transmittace of light transmitted through the opening parts of the first and second areas, that is, opening parts where electrodes are not arranged in the first and second areas may be increased, so that the visibility of the touch window may be degraded.

Hereinafter, a touch window according to the second embodiment will be described with reference to FIGS. 4 to 9. In the following description of the touch window according to the second embodiment, the details of structures or components the same as or similar to those of the touch window according to the first embodiment will be omitted.

Referring to FIG. 4, the wire electrode 300 may include a second mesh line LA2 formed by a plurality of sub-electrodes crossing each other and a second mesh opening part OA2 formed between second mesh lines LA2.

The second mesh opening part OA2 may have various shapes. For example, the second mesh opening part OA2 may have various shapes such as a polygonal shape including a rectangular shape, a diamond shape, a pentagonal shape or a hexagonal shape, or a circular shape. In addition, the second mesh opening part OA2 may have a regular shape or a random shape.

Referring to FIG. 5, according to the touch window of the second embodiment, the second mesh line LA2 may have a width different from that of the first mesh line LA1. In detail, a width W1 of the first mesh line LA1 may be narrower than a width W2 of the second mesh line LA2. In other words, the second mesh line LA2 may have the width W2 wider than the width W1 of the first mesh line LA1.

In addition, the sectional area of the first mesh electrode may be different from the sectional area of the second mesh electrode. In detail, the sectional area of the first mesh electrode of the sensing electrode 200 may be different from the sectional area of the second mesh electrode of the wire electrode 300. In more detail, the sectional area of the first mesh electrode may be narrower than that of the second mesh electrode. In other words, the area of the second mesh electrode may be wider than the area of the first mesh electrode, but the embodiment is not limited thereto. In other words, the sectional area of the first mesh electrode may be wider than that of the second mesh electrode.

In other words, the width W2 of the second mesh line LA2 may be greater than the width W1 of the first mesh line LA1, and the sectional area of the second mesh electrode may be wider than the sectional area of the first mesh electrode due to the width difference.

In addition, referring to FIG. 6, according to the touch window of the second embodiment, the second mesh line LA2 has a thickness different from that of the first mesh line LA1. In detail, a thickness T1 of the first mesh line LA1 may be thinner than a thickness T2 of the second mesh line LA2. In other words, the thickness T2 of the second mesh line LA2 may be thicker than the thickness T1 of the first mesh line LA1.

In addition, a sectional area of the first mesh line may be different from a sectional area of the second mesh line. In detail, the sectional area of the first mesh line of the sensing electrode 200 may be different from the sectional area of the second mesh line of the wire electrode 300. In more detail, the sectional area of the first mesh electrode may be narrower than that of the second mesh electrode. In other words, the sectional area of the second mesh electrode may be wider than the sectional area of the first mesh electrode. However, the embodiment is not limited thereto, but the sectional area of the second mesh electrode may be narrower than that of the first mesh electrode.

In other words, the thickness T2 of the second mesh line LA2 is thicker than the thickness T1 of the first mesh line LA1, and the area of the second mesh electrode may be wider than that of the first mesh electrode due to the thickness difference.

In addition, referring to FIG. 7, according to still another touch window according to the second embodiment, the second mesh line LA2 and the first mesh line LA1 may have mutually different widths and mutually different thicknesses.

In detail, the width W1 of the first mesh line LA1 is less than the width W2 of the second mesh line LA2, and the thickness T1 of the first mesh line LA1 may be thinner than the thickness T2 of the second mesh line LA2.

In other words, the width W2 of the second mesh line LA2 may be wider than the width W1 of the first mesh line LA1, and the thickness T2 of the second mesh line LA2 may be thicker than the thickness T1 of the first mesh line LA1.

In addition, the sectional areas of the first and second mesh electrodes may be different from each other. In detail, the sectional area of the first mesh electrode of the sensing electrode 200 may be different from the sectional area of the second mesh electrode of the wire electrode 300. In more detail, the sectional area of the first mesh electrode may be narrower than that of the second mesh electrode. In other words, the sectional area of the second mesh electrode may be wider than the sectional area of the first mesh electrode. However, the embodiment is not limited thereto, but the sectional area of the second mesh electrode may be narrower than the sectional area of the first mesh electrode.

In other words, the width W2 and the thickness T2 of the second mesh line LA2 may be greater than the width W1 and the thickness T1 of the first mesh line LA1, and the sectional area of the second mesh electrode may be greater than the sectional area of the first mesh electrode due to the difference in the width and thickness.

In addition, referring to FIG. 8, according to still another touch window of the second embodiment, the second mesh line LA2 and the first mesh line LA1 may have mutually different widths and the second mesh line LA2 and the first mesh line LA1 may have mutually different thicknesses.

In detail, the width W2 of the second mesh line LA2 may be narrower than the width W1 of the first mesh line LA1, and the thickness T1 of the second mesh line LA1 may be greater than the thickness T1 of the first mesh line LA1.

In addition, the areas of the first and second mesh electrodes may be different from each other. In detail, the sectional area of the first mesh electrode of the sensing electrode 200 may be different from the sectional area of the second mesh electrode of the wire electrode 300. In detail, the sectional area of the first mesh electrode may be narrower than that of the second mesh electrode. In other words, the sectional area of the second mesh electrode may be wider than the sectional area of the first mesh electrode, but the embodiment is not limited thereto. In other words, the sectional area of the second mesh electrode may be narrower than the sectional area of the first mesh electrode.

In other words, the width W2 of the second mesh line LA2 may be narrower than the width W1 of the first mesh line LA1, the thickness T2 of the second mesh line LA2 may be thicker than the thickness T1 of the first mesh line LA1, and the sectional area of the second mesh electrode may be wider than that of the first mesh electrode.

In addition, referring to FIG. 9, according to the touch window of still another embodiment, the second mesh line LA2 and the first mesh line LA1 may have mutually different widths and mutually different thicknesses.

In detail, the thickness T2 of the second mesh line LA2 may be thinner than the thickness T1 of the first mesh line LA1, and the width W2 of the second mesh line LA2 may be wider than the width W1 of the first mesh line LA1.

In addition, the first and second mesh electrodes may have mutually different sectional areas. In detail, the sectional area of the first mesh electrode of the sensing electrode 300 may be different from the sectional area of the second mesh electrode of the wire electrode 300. In more detail, the sectional area of the first mesh electrode may be narrower than that of the second mesh electrode. In other words, the sectional area of the second mesh electrode may be greater than that of the first mesh electrode. However, the embodiment is not limited thereto, but the sectional area of the second mesh electrode may be narrower than the sectional area of the first mesh electrode.

In other words, the thickness T2 of the second mesh line LA2 may be thinner than the thickness T1 of the first mesh line LA1, the width W2 of the second mesh line LA2 may be wider than the width W1 of the first mesh line LA1, and the sectional area of the second mesh electrode may be wider than the sectional are of the first mesh electrode.

According to the touch window of the embodiment, the mesh line of the wire electrode and the mesh line of the sensing electrode may be arranged mutually differently in size. In detail, the width and the thickness of the mesh line of the wire electrode are formed greater than the width and the thickness of the mesh line of the sensing electrode, or the area of the mesh electrode of the wire electrode is formed the area of the mesh electrode of the sensing electrode, so that the mesh line of the wire electrode is different from the size of the mesh line in size. Accordingly, the sectional area of the mesh line of the wire electrode may be greater than the sectional area of the sensing electrode.

Accordingly, the mesh electrode of the wire electrode can be sufficiently widely arranged as compared with the sensing electrode part, so that the sheet resistance and the line resistance of the wire electrode can be reduced.

Therefore, the wire electrode extending from the active area from the unactive area can be prevented from being viewed from the outside, so that the visibility of the touch window can be improved, and the resistance of the wire electrode can be reduced. Accordingly, the efficiency of the touch window can be improved.

Therefore, the touch window according to the embodiment can represent improved reliability and improved efficiency.

FIGS. 10 to 12 are views to explain an electrode forming process of a sensing electrode and/or a wire electrode according to the embodiment.

Referring to FIG. 10, for the sensing electrode and/or the wire electrode according to the embodiment, an electrode in a mesh shape can be formed by providing a metallic layer M on an entire surface of the substrate 100 and etching the metallic layer M in the mesh shape. For example, after depositing the metallic layer M including copper (Cu) on the entire surface of the substrate 100 including PET, the Cu layer is etched to form a Cu metal mesh electrode having an embossed mesh shape.

In addition, referring to FIG. 11, for the sensing electrode and/or the wire electrode according to the embodiment, after forming a resin layer R including an UV resin or thermosetting resin layer on the substrate 100, an intaglio pattern P having the mesh shape is formed on the resin layer R, and metallic paste MP may be filled in the intaglio pattern. In this case, the intaglio pattern of the resin layer may be formed by imprinting a mold having an embossed pattern.

The metallic paste 340 may include metallic paste including at least one of Cr, Ni, Cu, Al, Ag, Mo, and the alloy thereof. Accordingly, after filling and curing the metallic paste into the intaglio pattern P having the mesh shape, the metallic mesh electrode having the intaglio mesh shape can be formed.

In addition, referring to FIG. 12, for the sensing electrode and/or the wire electrode according to the embodiment, after forming a resin layer R including the UV resin or thermosetting resin layer on the substrate 100, the embossed nanopattern and micropattern having the mesh shape is formed on the resin layer R, and a metallic layer is formed on the resin layer through a sputtering scheme.

In this case, the embossed nanopattern and micropattern may be formed by imprinting the mold having the intaglio pattern.

Thereafter, metallic layer M formed on the nanopattern and the micropattern is etched so that the metallic layer formed on the nanopattern is removed and only the metallic layer formed on the micropattern remains. Accordingly, the mesh-shaped metallic electrode can be formed.

In this case, when the metallic layer M is etched, the difference between etching rates may be made with respect to the metallic layer M due to the difference between the contact area of the metallic layer M with the nanopattern 211 and the contact area of the metallic layer M with the micropattern 212. In other words, since the contact area between the micropattern and the metallic area is larger than the contact area between the nanopattern and the metallic layer, the metallic layer M formed on the micropattern is less etched. When the etching is performed at the same etching rate, the metallic layer formed on the micropattern remains and the metallic layer formed on the nanopattern is etched and removed, so that the embossed mesh-shaped metallic electrode having the micropattern may be formed.

The sensing electrode and/or the wire electrode of the touch window according to the embodiment can be formed as the mesh-shaped electrode including the metallic layer as shown in FIGS. 10 and 12 as described above.

Hereinafter, a touch device formed by combining the touch window described above with a display panel will be described with reference to FIG. 13.

Referring to FIG. 13, the touch device according to the embodiment may include a display panel 800 and a touch window provided on the display panel 800. For example, the display panel may be bonded to and combined with the touch window through an adhesive layer 700 including an optically clear adhesive (OCA).

For example, as shown in FIG. 13, although the touch device includes a cover substrate 101 and a substrate 100, the cover substrate 101 and the substrate 100 are bonded to each other through the adhesive layer 700, and the touch window, in which first and second sensing electrodes 210 and 220 are spaced apart from each other on the substrate 100, is bonded to the display panel 800 through the adhesive layer 700, the embodiment is not limited thereto, but the cover substrate 101 may be omitted.

When the display panel 800 is a liquid crystal display panel, the display panel 800 has a structure in which a first-prime substrate 810 including a thin film transistor (TFT) and a pixel electrode is combined with a second-prime substrate 820 including color filter layers while interposing a liquid crystal layer between the first-prime substrate 810 and the second-prime substrate 820.

Further, the display panel 800 may be a liquid crystal display panel having a color filter on transistor (COT) structure formed by combining the first-prime substrate 810, which is formed thereon with the TFT, a color filter, and a black matrix, with the second-prime substrate 820 while the liquid crystal layer is interposed between the first-prime and second-prime substrates 810 and 820. In other words, the TFT may be formed on the first-prime substrate 810, a protective layer may be formed on the TFT, and the color filter layer may be formed on the protective layer. In addition, the pixel electrode, which makes contact with the TFT, may be formed on the first-prime substrate 810. In this case, in order to improve an aperture ratio and simplify a mask process, the black matrix may be omitted, and a common electrode may perform a function of the black matrix together with the inherent function thereof.

In addition, when the display panel 800 is a liquid crystal panel, the display device may further include a backlight unit for supplying light onto a rear surface of the display panel 800.

When the display panel 800 is an organic electroluminescence light emitting device, the display panel 800 includes self-luminescence device which does not require any additional light source. A thin film transistor is formed on the first-prime substrate 810 of the display panel 800, and an organic light-emitting device making contact with the thin film transistor may be formed. The organic light-emitting device may include an anode, a cathode and an organic light-emitting layer formed between the anode and the cathode. In addition, the display panel 800 may further include the second-prime substrate 820, which performs the function of an encapsulation substrate for encapsulation, on the organic light-emitting device.

Hereinafter, one example of a touch device employing the touch window according to the embodiment will be described with reference to FIGS. 14 to 17.

Referring to FIG. 14, a mobile terminal is illustrated as an example of the touch device. The mobile terminal may include the active area AA and the unactive area UA. The active area AA is an area in which a touch signal is sensed due to the touch by a finger, and an instruction icon pattern part and a logo may be formed in the unactive area UA.

Referring to FIG. 15, the touch window may include a flexible touch window. Thus, the touch device including the touch window may be a flexible touch device which may be bent or flex by a hand of a user.

Referring to FIG. 16, the touch window may be applied to a vehicle navigation system as well as the touch device, such as the mobile terminal.

Referring to FIG. 17, the touch window may be applied inside a vehicle. In other words, the touch window may be applied to various parts in the vehicle where the touch window is applied. Accordingly, the touch window is applied to a dashboard as well as a PND (Personal Navigation Display), thereby realizing a CID (Center Information Display). However, the embodiment is not limited thereto. In other words, the touch panel may be used in various electronic products.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch window comprising:
   a substrate comprising an active area and an unactive area; and
   a sensing electrode on the active area and a first sub-wire electrode connected with the sensing electrode,
   wherein the substrate comprises a first area having the sensing electrode and a second area having the first sub-wire electrode,
   the sensing electrode and the first sub-wire electrode are provided in a mesh shape,
   the active area comprises a first active area having the sensing electrode and a second active area having the first sub-wire electrode,
   wherein the sensing electrode and the first sub-wire electrode include a mesh line and a mesh opening,
   wherein a first unit area having a column-directional width and a row-directional width is defined in the sensing electrode, and a second unit area having the same area as the first unit area is defined in the first sub-wire electrode,
   wherein the first active area has the sensing electrode by a first closing ratio,
   wherein the second active area has the first sub-wire electrode by a second closing ratio, and
   wherein the first closing ratio is defined as an arrangement area of the mesh line of the sensing electrode in the first unit area, and the second closing ratio is defined as an arrangement area of the mesh line of the first sub-wire electrode in the second unit area,
   wherein a size of the second closing ratio is in a range of 0.8 times to less than 1 times greater than a size of the first closing ratio.

2. The touch window of claim 1, further comprising a second sub-wire electrode provided on the unactive area and connected with the first sub-wire electrode.

3. The touch window of claim 2, wherein the first sub-wire electrode is formed integrally with the second sub-wire electrode.

4. The touch window of claim 1,
   wherein the sensing electrode comprises a first mesh line, the first sub-wire electrode comprises a second mesh line, and a width of the first mesh line is different from a width of the second mesh line.

5. The touch window of claim 4, wherein a thickness of the first mesh line is different from a thickness of the second mesh line.

6. The touch window of claim 4, wherein the sensing electrode comprises a first mesh electrode, the first sub-wire electrode comprises a second mesh electrode, and a sectional area of the first mesh electrode is different from a sectional area of the second mesh electrode in size.

7. The touch window of claim 6, wherein the sectional area of the second mesh electrode is wider than the sectional area of the first mesh electrode.

8. The touch window of claim 6, wherein the sectional area of the first mesh electrode is wider than the sectional area of the second mesh electrode.

9. The touch window of claim 4, wherein the width of the second mesh line is wider than the width of the first mesh line.

* * * * *